United States Patent [19]

Cornaby et al.

[11] 4,398,225

[45] Aug. 9, 1983

[54] COMBINED SERIALIZER ENCODER AND DECODER FOR DATA STORAGE SYSTEM

[75] Inventors: David T. Cornaby, Roy; Eric J. Halvorsen, East Layton, both of Utah

[73] Assignee: Iomega Corporation, Ogden, Utah

[21] Appl. No.: 257,485

[22] Filed: Apr. 24, 1981

[51] Int. Cl.³ .............................................. G11B 5/09
[52] U.S. Cl. ........................................ 360/39; 360/46
[58] Field of Search ....................... 360/40, 45, 39, 46

[56] References Cited

U.S. PATENT DOCUMENTS

| | | | |
|---|---|---|---|
| 3,689,899 | 9/1972 | Franaszek | 340/172.5 |
| 3,852,687 | 12/1974 | Hodges | 332/11 R |
| 3,996,613 | 12/1976 | Manning et al. | 360/40 |
| 4,146,909 | 3/1979 | Beckenhauer et al. | 360/39 |
| 4,150,404 | 4/1979 | Tercic et al. | 360/39 |
| 4,201,980 | 5/1980 | Friedman et al. | 360/40 |
| 4,245,263 | 1/1981 | Rathbun et al. | 360/45 |
| 4,261,019 | 4/1981 | McClelland | 360/40 |
| 4,323,931 | 4/1982 | Jacoby | 360/40 |
| 4,337,458 | 6/1982 | Cohn et al. | 360/40 |

FOREIGN PATENT DOCUMENTS 1925869  5/1969  Fed. Rep. of Germany .
2205422  2/1972  Fed. Rep. of Germany .
2269823  11/1975  France .

OTHER PUBLICATIONS

IBM Technical Disclosure Bulletin, vol. 17, No. 5, Oct. 1974, M. Miessler, "Translator for Run Length Limited Code".

IBM Technical Disclosure Bulletin, vol. 22, No. 6, Nov. 1979, D. H. Neal et al., "Data Modulation/Demodulation for Group Code Recording With Phase Encode Capability".

Primary Examiner—Vincent P. Canney
Attorney, Agent, or Firm—Woodcock, Washburn, Kurtz, Mackiewicz & Norris

[57] ABSTRACT

An improved method and apparatus for encoding data prior to storage on a disk or other magnetic media is disclosed which features comparison of input data patterns with stored data patterns in a programmable logic array or other logical mapping structure and outputting of uniquely encoded patterns of flux transitions to be written to said magnetic media based upon the results of the comparison. The apparatus additionally comprises means for serializing the data to be written and deserializing data upon reading from the media.

9 Claims, 2 Drawing Figures

| CODE | DATA |
|---|---|
| 0 0 1 0 0 0 | 1 0 0 0 |
| 1 0 1 0 0 0 | 1 0 0 1 |
| 0 0 0 1 0 1 0 0 0 | 1 0 1 0 0 0 |
| 0 0 1 0 0 1 0 0 0 | 1 0 1 0 1 0 |
| 1 0 1 0 0 1 0 0 0 | 1 0 1 0 1 1 |
| 0 0 0 0 0 1 0 0 0 | 1 0 1 0 0 1 |
| | |
| 0 1 0 | 0 0 |
| 0 0 0 0 1 0 | 0 1 0 0 |
| 0 0 1 0 1 0 | 0 1 0 1 |
| 1 0 1 0 1 0 | 0 1 1 1 |
| 0 0 0 0 0 1 0 1 0 | 1 0 1 1 0 0 |
| 0 0 1 0 0 1 0 1 0 | 1 0 1 1 1 0 |
| 1 0 1 0 0 1 0 1 0 | 1 0 1 1 1 1 |
| 0 0 0 1 0 1 0 1 0 | 1 0 1 1 0 1 |
| | |
| 1 0 0 | 1 1 |
| 0 0 0 1 0 0 | 0 1 1 0 |
| | |
| 0 0 0 0 0 0 1 0 0 | SYNC BYTE |
| | |
| 0 0 0 | 0 1 |
| 0 0 1 | 1 0 |
| 0 0 0 1 0 1 | 1 0 1 0 |
| 0 0 0 0 0 1 | 1 0 1 1 |

PAD MARKS (applies to last group)

COMBINED SERIALIZER ENCODER AND DECODER FOR DATA STORAGE SYSTEM

FIELD OF THE INVENTION

This invention relates broadly to the field of storing digital data on, for example, magnetic disk media. More particularly, the invention relates to method and apparatus for conversion of data received byte-wise from a host computer or other source to a serial data stream for writing on disk, additionally for converting the data received from the host into an encoded form which may be stored more compactly on the disk and for reconverting the encoded, serialized data into byte-wise decoded data for retransmission to a host computer.

BACKGROUND OF THE INVENTION

This invention relates primarily to the writing of digital data received from a host onto a magnetic storage media such as a magnetic disk drive. The typical method of writing such data onto a magnetic disk is to energize a coil having an air gap disposed in close proximity to a magnetizable disk so that a magnetic flux transition is written to the disk. Clearly the density at which such transitions can reliably be written and later detected is a limitation on the performance of any given disk drive; it would be desirable to increase this density in order to improve the performance of the disk drive. An alternative method for improving the performance of the drive is to encode data as received from a host computer or other source of data, so that less actual flux transitions are required to represent a given quantity of data. The prior art shows numerous methods for encoding data such as data compression, i.e., removing redundancies, and the like. Other methods include logical analysis of data received from a host computer and writing an encoded representation of the data which can later be decoded to reconstruct the original data. In particular, such codes, commonly known as "run length limited codes", utilize the fact that what is actually written on disk is magnetic flux transitions which are used to indicate the presence of binary "ones"—that is, binary "zeroes" are not specifically written. Instead the rules of the code are used to decode the encoded data; the zeroes thus eliminated are reinserted upon decoding. In this way, flux transitions corresponding only to the ones in the data are written, and the zeroes are interposed upon decoding. An example of such a run length limited code is shown in U.S. Pat. No. 3,852,687 to Hodges. This code may be termed a 2,8 code; that is, one according to which at least 2 zeroes are to be interposed between each flux change recorded on the disk, while no more than 8 zeroes may be interposed between flux changes on the disk. The Hodges patent explains how these two rules may be used to encode data of a fixed length per code sequence. The advantage provided is that eight bits can be reduced in some cases to five recorded flux changes, i.e., eight data bits are "mapped" to five flux changes, providing up to a 40% saving in space.

The Hodges patent was filed in 1973. At that time, the solid state manufacturing technology available and used to implement its method was not as advanced as that available at the time of the present application. In paticular, the solid state technology then current was so-called bipolar technology, while the most advanced integrated circuit devices then available are known as "MSI", for medium scale integration. This bipolar technology offers the advantage of fast switching, so that the logical operations required by the Hodges patent can be performed at a high data rate, but offers the disadvantage that a great deal of heat is generated in these operations. This heat limits the number of logic gates which can be packed onto a single chip, thus providing a minimum size to the apparatus for performing the Hodges method. Present tendencies are to implement such coding methods in LSI (Large Scale Integrated) circuits, which operate using field effect transistor (FET) circuitry. This type of circuitry generates much less heat than the bipolar technology referred to above, thus enabling greater integration and saving of space per given number of logic gates, but the switching rate available using the FET technology is slower. Accordingly, if a given data rate is to be maintained using LSI technology an encoding technique is required which calls for lower numbers of logical operations to be performed.

It will be appreciated by those skilled in the art that data is typically input by a host to a disk drive for storage byte-wise. That is, bits are parallelled over an eight-bit line such that eight-bit bytes arrive synchronously. However, data is stored on a disk drive serially; that is, one bit at a time. Accordingly, it is necessary to provide means for serializing data in a write mode and for deserializing the data in a read mode. It would naturally be desirable if this operation could be combined with an encoding technique as discussed above.

OBJECT OF THE INVENTION

Accordingly, it is an object of the invention to provide combined serializer/encoder circuitry for a disk drive.

A further object of the invention is to provide such serializer/encoder circuitry which can additionally be used for decoding and deserializing operations in a read mode to yield a hardware saving.

A further object of the invention is to provide a coding method calling for minimal logical switching such that large scale integrated (LSI) field effect transistor (FET) technology can be used without sacrifice of data rate.

The ultimate object of the invention is to provide improved performace for a disk drive.

SUMMARY OF THE INVENTION

The above needs of the art and objects of the invention are accomplished by the present invention which comprises hardware means for serializing and encoding data in a write mode and deserializing and decoding data in a read mode. The chief element of the apparatus is a programmable logic array which maps given patterns of input data to given coded patterns requiring less flux transitions for their recording then the input data. The programmable logic array then recognizes the uniquely encoded data patterns upon reading and converts them back into the original data format. Shift registers are provided at the input and output sides of the programmable logic array for serializing and deserializing the data and for holding it in convenient format for addressing the programmable logic array. In the write mode the data is examined by the programmable logic array in multiples of two, while its output is encoded in multiples of three bits. However, the three bits contain less logical ones than does the data, thus requiring less flux transistions for the writing of the data. In a read mode the encoded data is examined, again in multiples of three, outputting decoded bytes in multiples of two.

BRIEF DESCRIPTION OF THE DRAWINGS

The invention will be better understood if reference is made to the accompanying drawings, in which.

DESCRIPTION OF THE PREFERRED EMBODIMENTS

Figure 1:
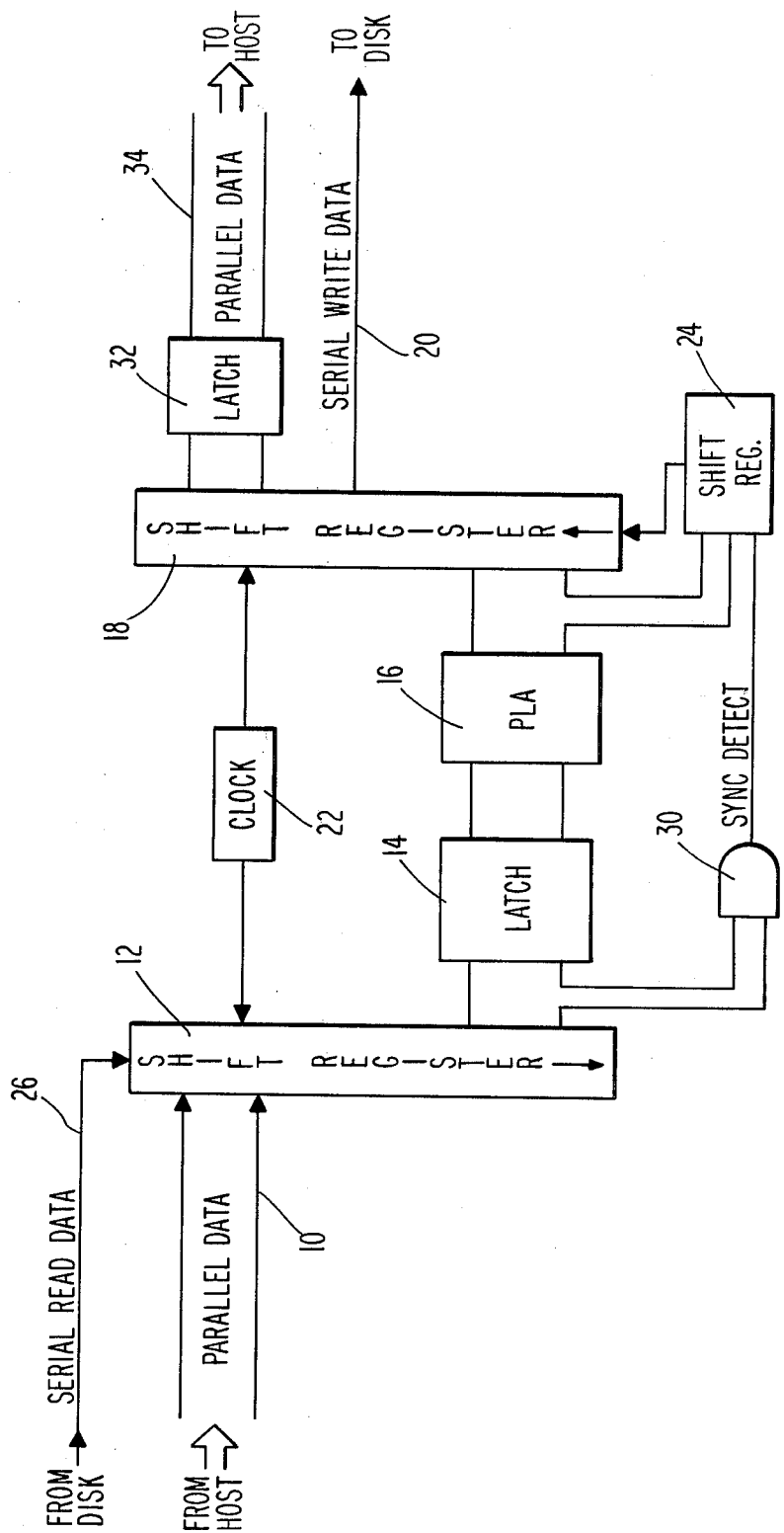
FIG. 1 shows a hardware embodiment of the apparatus for performing the method of the invention.

Referring now to FIG. 1 the hardware for performing the serializing and encoding operations in the write mode and deserializing and decoding in the read mode is shown. Describing the write mode first, data is read byte-wise, that is, in parallel, from an input bus 10 to a shift register 12 in which the data is substantially serialized. That is, as soon as one byte has been fully read into the shift register 12 a second begins to follow it bit-by-bit. The data input from the host is fed to a latch 14 two by two. Numbers of bits equal to multiples of two, i.e., 2, 4, or 6 are compared with bit patterns stored in a programmable logic array 16 or other logical mapping structure, such as a read only memory (ROM). In a presently preferred embodiment the programmable logic array is preferred as it is more flexible in use. When correspondence between a 2-, 4- or 6-bit data pattern and a stored data pattern of the same length is detected, the programmable logic array (PLA) 16 outputs an encoded data pattern to a second shift register 18. The output of the shift register 18 is written over a single bit wide line 20 to the disk for serial storage. Thus, input data patterns are compared in the programmable logic array 16 with stored patterns and upon detection of identity a uniquely encoded output is written to disk for each pattern of bits. A clock 22 keeps the shift registers operating in sequence, while a third shift register 24 controls the 2 by 2 motion of the data on in the write operation. Thus, it will be understood when a two bit data pattern is found to be equal to one stored in the PLA 16, three bits are immediately output by the PLA 16 to the shift register 18 and written to the disk. If these two bits are not identified, two additional bits are added to the sample and this four bit pattern is then looked at to determine whether it corresponds to one stored in the PLA. Again, if no match is found, two additional bits are added making a total of six, which are compared to six-bit patterns stored in the programmable logic array. All possible combinations of 2, 4 and 6 bits are accordingly stored in the PLA, each with a uniquely encoded pattern corresponding thereto, which is output to the shift register 18 and written to the disk upon detection. The code, described below, is such that a net saving in storage space required on disk is realized.

The read operation is substantially the inverse of the write operation just described. Serial data is received from a disk over a single bit line 26 in shift register 12. The phase transitions are decoded into ones and zeros as in accordance with the well known modified frequency modulation (MFM) principles. As noted above, two data bits are mapped to three code bits, four data bits to six code bits and six data bits to nine code bits. Accordingly, the maximum number of encoded bits which needs to be considered at any given time is nine. Hence, the maximum number of bits which can be passed at once from the shift register 12 to the latch 14 is nine. Similarly, each nine bit pattern is looked at by a synchronization bit detector 30 to determine whether the bits being looked at are in fact indicative of the beginning of a sector on a disk track. If so, the shift register 24 is enabled so that examination of the stored data, again in multiples of three bits, by the programmable logic array to see if any 3-, 6-, or 9-bit group corresponds to any stored pattern of encoded bits, begins. When a correspondence is detected, the corresponding data pattern is output to the shift register 18. When an 8-bit byte has thus been assembled it is output to a latch 32 for byte-wise transmission to a host over a bus 34. This decoding process continues until the end of the data block.

Stated somewhat more generally the operation of the apparatus of the invention is as follows. In the decode mode the flux transitions actually read are converted back into logical ones and zeroes. The serially generated data bits are presented to a shift register 12 which is shifted at the serial data rate. After each shift a synchronization byte detect gate 30 attempts to match the shifted data with a predetermined synchronization byte. Upon detection of the synchronization byte, the latch 14 is then operated every mth time register 12 is shifted (where m is the number of bits comprising the smallest code-to-data mapping; in the preferred embodiment described above, m=2). The m by m "snapshots" of the serial data are used as the input to a programmable logic array of other mapping structure. This structure translates the code to data when a correspondence is detected. The indication of the length of the data word is also thus determined. A second shift register 18 is then loaded with the data word while a third shift register 24 is loaded with a length indicator. The shift register 18 is shifted as indicated by the third shift register 24 such that the decoded bits are not presented to the programmable logic array twice. A further latch 32 is loaded with the decoded data for writing to the bus byte-wise.

Similarly, in the encode mode byte wide data is presented in parallel to the first shift register 12. This shift register 12 is shifted at a ratio of n/m (where n is the length in bits of the smallest data word, here three, and m is the length of the smallest code word, here two) of the write clock frequency. As above, a latch 14 provides a snapshot of the serialized data stream. A second shift register 18 receives the code word while third shift register 24 receives the length indication. Data is output by the shift register 18 over a bit wide channel 20 at the full write clock frequency to be written to the magnetic disc media.

Figure 2:
FIG. 2 shows the mapping of the data to code and vise versa.

The specific code used in a preferred embodiment is shown in FIG. 2. It will be recognized by those skilled in the art that the code, shown in the left column, provides a uniquely encoded series of flux transistions for each possible data sequence input, shown in the right column, and that the codes obey the rules stated above, i.e., that each pair of flux transitions is separated by at least one zero, thus enabling the flux transitions to be written more closely to one another, while no more than nine zeroes are interposed between any two flux transitions, thus insuring that there is some minimum number of flux transitions available for self-clocking of the data frequency, which may be performed in accordance with the modified frequency modulation principles well known in the prior art. It will be appreciated that unlike prior art run length limited coding, the length of each data sample encoded and the corresponding length of the encoded data written to disk varies in dependence on the input data pattern, according to the invention unlike the prior art, in which the data was encoded byte-wise. This provides additional flexibility and further means that the actual amount of data storage space saving realized varies with the input data. FIG. 2 also shows the synchronization byte used in a preferred embodiment, and shows pad marks which may be used to ensure that the amount of data written to a given sector on disk is the same for each sector, thus providing a control for error decoding and parity checking operations.

Those skilled in the art will recognize that there has been described a unique serializer/encoder and deserializer/decoder apparatus together with a unique code, preferably for use in conjunction with a programmable logic array or other logical mapping structure. Further, it will be realized that there has been described a method of encoding and decoding data which does not require great numbers of logical switching operations and thus is amenable to large scale integration, field effect transistor implementation, so that this advantageous technology can be employed without reduction of the effective data rate of the apparatus. Finally, it will be appreciated by those skilled in the art that there are numerous modifications and improvements that can be made to the invention without departing from its essential spirit and scope which is therefore not to be limited by the above exemplary disclosure, but only by the following claims.

We claim:

1. Method of decoding data stored on magnetic media in the form of encoded sequences of flux transitions, comprising the steps of:

generating data bits corresponding to portions of said encoded sequence of flux transitions;

comparing said data bits generated according to the pattern of said flux transitions with stored data bit patterns; and outputting decoded data patterns corresponding to said stored pattern of data bit patterns as a result of said comparison step, wherein a first integral number of said generated data bits is compared with stored patterns of data bits, and wherein if a given comparison step does not yield correspondence between stored data bit patterns and said generated data bit patterns, an additional integral number of data bits is generated and added to said previously generated number, and said comparison step is reperformed.

2. Method of decoding data stored on magnetic media in the form of encoded sequences of flux transitions, comprising the steps of:

generating data bits corresponding to portions of said encoded sequence of flux transitions;

comparing said data bits generated according to the pattern of said flux transitions with stored data bit patterns; and outputting decoded data patterns corresponding to said stored pattern of data bit patterns as a result of said comparison step, wherein a predetermined number of sequential ones of generated data bits corresponding to recorded flux transitions are compared with a stored pattern of bits to detect actual location of said recorded flux transitions on said media.

3. Method of decoding data stored on magnetic media in the form of encoded sequences of flux transitions, comprising the steps of:

generating data bits corresponding to portion of said encoded sequence of flux transitions;

comprising said data bits generated according to the pattern of said flux transitions with stored data bit patterns; and outputting decoded data patterns corresponding to said stored pattern of data bit patterns as a result of said comparison step, comprising the additional step of storing said decoded data bits until enough said decoded bits have been accumulated to equal the length of a predetermined byte size.

4. A circuit for encoding digital data to be stored in a write mode and for decoding encoded digital data in a read mode, said circuit comprising:

first shift register means for containing a plurality of data bits to be encoded in a read mode or decoded in a write mode, said bits being supplied in parallel in the write mode and serially in the read mode;

memory means for storing predetermined bit patterns and for outputting said bit patterns upon supply thereto of the corresponding address bits;

latch means for presenting data to be encoded in a write mode or decoded in a read mode to said memory means as an address, said latch means being connected to said first shift register for receiving a predetermined number of bits stored therein; and second shift register means connected to said memory means for storing the bits output thereby, and outputting said bits serially in a write mode and in parallel in a read mode.

5. The circuit of claim 4 wherein said latch means receives bits from said first shift register in predetermined multiples of bits.

6. The circuit of claim 5 wherein said latch means receives bits from said first shift register by twos in the write mode and by threes in the read mode.

7. The circuit of claim 4 wherein said memory means outputs bits to said second shift register in predetermined quantities.

8. The circuit of claim 7 wherein said memory means outputs bits by threes in the write mode and twos in the read mode.

9. The circuit of claim 4 further comprising third shift register means to control the number of bits output by said memory means to said second shift register after performance of each comparison operation.

* * * * *